United States Patent [19]
Booy

[11] 3,804,423
[45] Apr. 16, 1974

[54] SHAFT SEAL THROTTLE BUSHING
[75] Inventor: Max Lorenz Booy, Wilmington, Del.
[73] Assignee: E. I. du Pont de Nemours and Company, Wilmington, Del.
[22] Filed: Nov. 16, 1971
[21] Appl. No.: 199,272

[52] U.S. Cl............................ 277/1, 277/3, 277/15, 277/53, 277/74
[51] Int. Cl............................................. F16j 15/40
[58] Field of Search.......... 277/1, 3, 15, 64, 67, 59, 277/74, 70, 53, 134, 135

[56] References Cited
UNITED STATES PATENTS

| | | | |
|---|---|---|---|
| 1,878,731 | 9/1932 | Thompson | 277/1 |
| 2,109,680 | 3/1938 | Neveling | 277/134 |
| 3,364,523 | 1/1968 | Schippers | 277/134 |
| 2,326,824 | 8/1943 | Browne et al. | 277/15 |

Primary Examiner—Louis R. Prince
Assistant Examiner—Robert J. Smith

[57] ABSTRACT

Method and apparatus for sealing a rotating drive shaft that enters a vessel for processing viscous material includes the steps of feeding a portion of the supply stream of viscous material into the vessel in one direction through a space formed between a bore in the vessel and the shaft while allowing a smaller portion of the material to flow through the space in the opposite direction to atmosphere as leakage. The processing equipment comprises a rotatably driven shaft and a vessel having a casing provided with both a passage for the introduction of the viscous material and a bore through which the shaft extends into the vessel. The bore has end and mid portions all larger in diameter than the shaft. The passage extends into the bore through the mid portion of the bore. One of the end portions leads into the vessel; the other end portion leads toward the outside of the vessel. The bore and the shaft form annular chamber means for providing a lower resistance to flow of the viscous material through the one end than through the other end portion of the bore.

4 Claims, 5 Drawing Figures

INVENTOR
MAX LORENZ BOOY

BY Howard P. West Jr.
ATTORNEY

PATENTED APR 16 1974  3,804,423

INVENTOR
MAX LORENZ BOOY

BY  Howard P. West Jr.
ATTORNEY 3,804,423

SHAFT SEAL THROTTLE BUSHING

BACKGROUND OF THE INVENTION

This invention concerns melt processing equipment for plastics, rubber and other viscous materials. More specifically, it concerns the sealing of drive shafts entering such equipment.

Much of the equipment used in the chemical industry has agitators, forwarding screws, recirculating paddles and blades, or intermeshing rotors to mix, transport, shear and react ingredients introduced to a vessel in either a batch or a continuous process. Typically, these rotating elements are externally driven by one or more shafts which extend through one or both ends of the vessel casing. Where these shafts enter the vessel, a seal must be provided. In low pressure and vacuum processes, the seal is often critical insofar as it prevents entrance of contaminants, such as dirt, air or water vapor. This is especially critical in polymer melt processing where water vapor and air depolymerize and degrade the product.

In the production of nylon, the relative viscosity of the polymer is usually increased, in a vessel referred to as a finisher, by the application of heat and the removal of steam. Although the leakage problem is greater when such finishers are operated under a vacuum, seal leakage can occur even when the vessel operates at atmosPheric or slightly elevated pressure since gases and vapors can diffuse through the seals into the vessel.

The seal most commonly used consists of packing rings pressed into place around the shaft and retained by a gland. This seal requires periodic tightening as the packing wears; these materials tend to shred and contaminate the process. Alternatively, seals with forced feed lubricant have been used but these also present a source of contamination and require pressure control to limit the amount of lubricant entering the vessel. Other seals depend on hardened and polished, metal-to-metal, contact surfaces but these tend to score and gall, the seal leaks and metal is deposited in the product. Seals blanketed with inert gas above atmospheric pressure to prevent introduction of harmful gases or vapors are also undesirable since the quantity of gas leaking into the process is difficult to control and increases the total volume of gas which must be taken out through exhaust ports; furthermore, variable flow of blanketing gas into the process vessel makes polymerization reactions or drying operations difficult to control.

It is an object of this invention to provide an improved seal for rotary shafts entering a vessel in which viscous or degradable materials are processed at low pressures. A further object is to provide a seal operable over a wide range of pressure and temperature conditions with either single- or two-phase flow through the vessel. It is another object to provide a seal which eliminates contamination from degraded process ingredients, packing materials and lubricants, as well as contamination resulting from leakage of air or other undesirable gases into the process stream.

SUMMARY OF THE INVENTION

Method and apparatus for sealing rotating shafts that enter a vessel for processing viscous material through a clearance bore in the vessel, includes the method steps of feeding under pressure a portion of the supply stream to the vessel into the vessel in one direction through the clearance between the shaft and the bore while allowing another portion to flow in the opposite direction and establishing a lower resistance to flow of the viscous material in said one direction than in said opposite direction. The processing equipment is comprised of a rotatably driven shaft and a vessel having a casing provided with both a passage for the introduction of a viscous material and a bore through which the shaft extends into the vessel, said bore having end and mid portions all larger in diameter than said shaft, said passage extending into said bore through said mid portion, one of said end portions leading into said vessel, the other end portion leading in the opposite direction, said bore and said shaft forming annular chamber means for providing a lower resistance to flow of said viscous material through said one end than through said other end portion.

In the illustrated embodiments, rotating shafts entering a processing vessel for viscous or degradable materials are sealed to exclude entrance of undesirable contaminants by feeding a part or all of the process stream supplied to the vessel to and through a throttling sleeve around a driven shaft entering the vessel. The throttling sleeve extends in both directions along the shaft from an interior mid step at the process stream feed point and has steps of reduced inside diameter at its ends, presenting annular spaces between the sleeve and shaft. The process feed pump generates a positive pressure on the feed stream by forcing the stream between the shaft and inner step of the restricting sleeve into the vessel. This positive pressure insures flow of some of the process stream in the opposite direction, to the outside of the vessel, between the outer step and shaft but the major part of the stream enters the process vessel through the annular throttling space between the inner step and the shaft. The low proportion of leakage to flow entering the vessel is controlled by the relative lengths of the inner and outer steps and by the clearances of the annular spaces between the shaft and the sleeve.

DESCRIPTION OF THE ILLUSTRATED EMBODIMENTS

Figure 1:
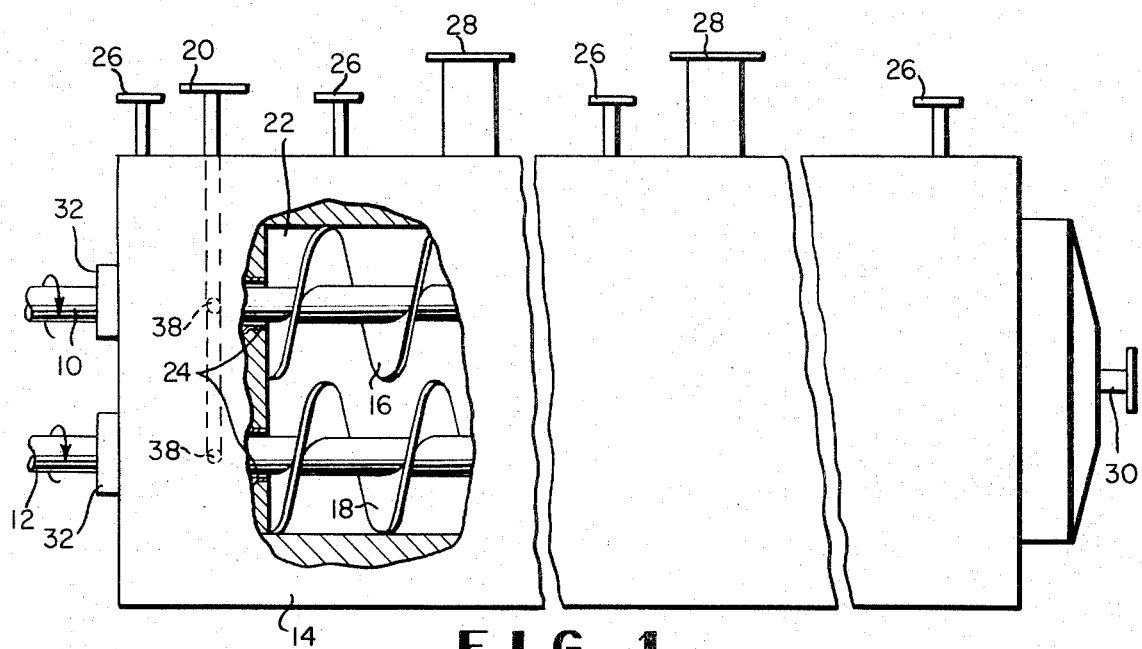
FIG. 1 is a side view of a process vessel into which the seal of the instant invention has been incorporated.

A twin screw processing vessel equipped with the seal of the instant invention is shown in FIG. 1. Twin shafts 10, 12 enter a vessel casing 14 and drive forwarding screws 16, 18. Viscous material enters the vessel through inlet nozzle 20 which communicates with a working chamber 22 through a pair of throttling sleeves 24. Vessel temperature is maintained by the use of heat transfer fluid supplied through nozzles 26. Volatile reaction products are removed through ports 28 which are connected to a source of vacuum. The viscous material is transported through the vessel by forwarding screws 16, 18 and exits through port 30 to subsequent processing.

Figure 2:
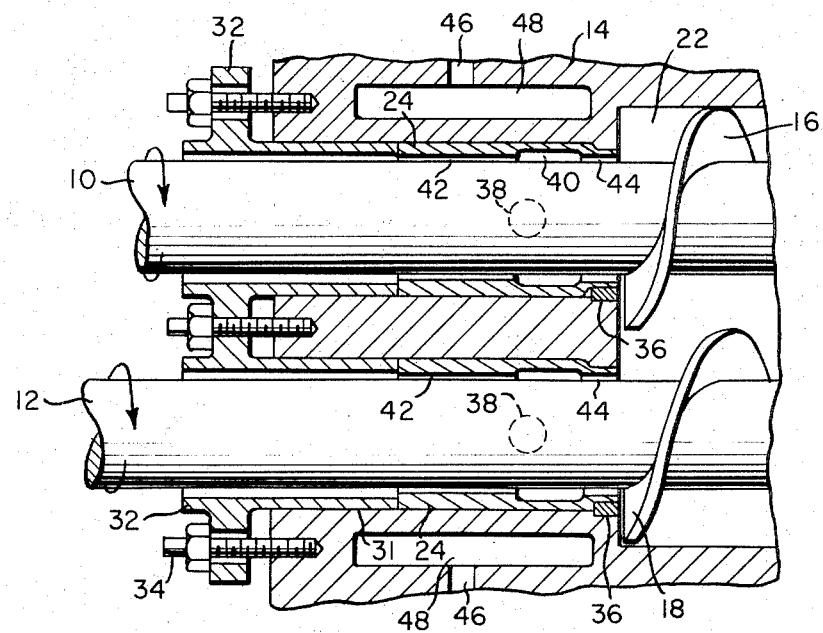
FIGS. 2 and 3 are enlarged, fragmentary, vertical and horizontal, sectional views, respectively, through the sealed shafts shown in FIG. 1.
Figure 3:
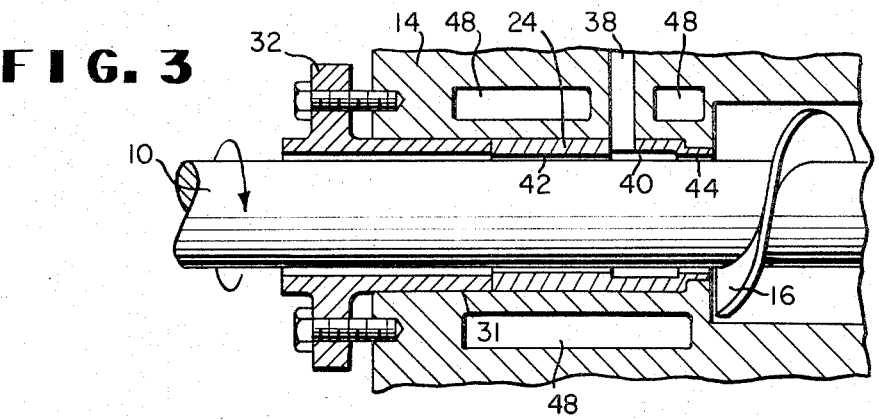

Details of the sleeves 24 appear in FIGS. 2, 3, where entry of twin shafts 10, 12 into casing 14 and their extension into finishing chamber 22 are also shown. Casing 14 is bored at 31 to receive the sleeves 24 which are retained by glands 32 held in place by threaded fasteners 34 spaced around the glands. Each sleeve is keyed to the casing at 36 (FIG. 2) to prevent rotation. The process stream enters through passages 38 which place inlet nozzle 20 in communication with an annular chamber 40 presented by an enlarged inside diameter extending through the mid step of each sleeve 24. End steps of each sleeve 24 have lesser inside diameters, presenting relatively reduced annular chambers 42, 44. A positive pressure is required in the chamber 40 to force the process stream through the restriction imposed by the reduced clearance through chamber 44 between the shaft and the inner end step of the sleeve; this pressure also forces some process material through the smaller clearance of chamber 42 to the outside of the vessel. The leakage of process material from the vessel therefore fills the annular spaces 42 and prevents entry of any foreign materials into the finishing chamber 22. Working temperature is maintained by circulating heat transfer fluid, e.g., Dowtherm, through passages 46 into cavities 48 in casing 14. The shafts 10, 12 are supported by bearings (not shown) external to the vessel casing and are driven by a motor (not shown).

In operation, there is continual process leakage along the annular clearance forming chamber 42 between the shaft and outer end step to the outside of the process vessel while the major part of the process stream fed to inlet passage 38 enters the vessel through the annular clearance forming chamber 44. The temperature of heat sensitive materials or high melting point materials supplied to the process vessel can be maintained by the use of electrical heaters (not shown) or heat transfer fluids such as Dowtherm circulating through either the cavities 48 or a jacket surrounding the casing. Continuous passage of process material through the throttling sleeves at positive pressure excludes entrance of air or vapors undesirable for the process and also sweeps the passages to prevent formation of degradation products or gel which can occur in heated stagnant areas when processing polymers such as nylon. The length and radial clearance of annular chambers 42, 44 control the pressure required to supply process materials to the vessel at the desired rate and establish the resistance to flow of the process material in opposite directions along shafts 10, 12, i.e., the proportion of flow into the vessel in one direction and to atmosphere in the opposite direction. Chamber 44 is always sized to establish a lower resistance to process flow into the vessel than leakage flow in the opposite direction out through the chamber 42 to atmosphere.

Figure 4:
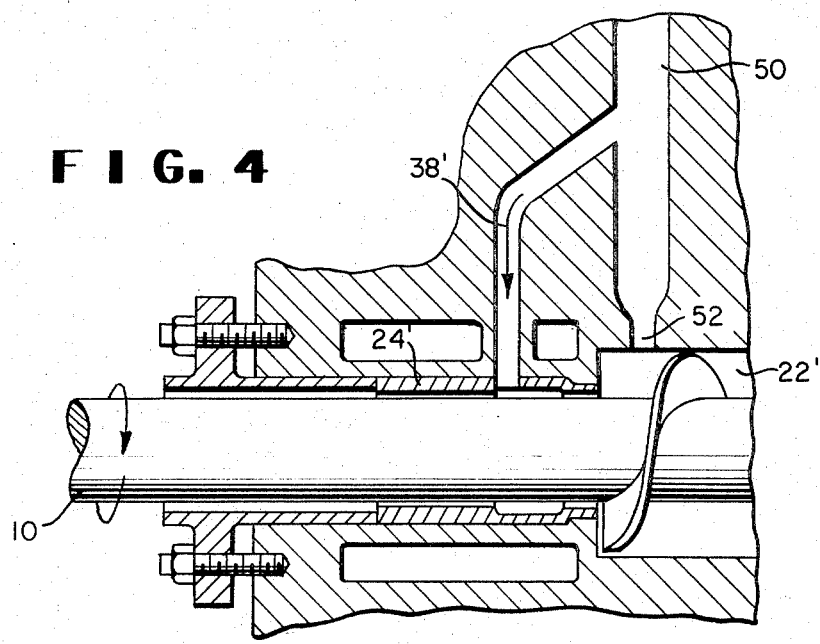
FIG. 4 is a horizontal, sectional view showing a modification in which a branch stream of process material is supplied to the throttling sleeve.

In FIG. 4, a part of the process material is diverted from a main supply channel 50 through passage 38' into the sleeve 24'. Restriction 52 in the exit port from channel 50 to the working chamber 22' insures diversion of process material through branch passage 38'.

Figure 5:
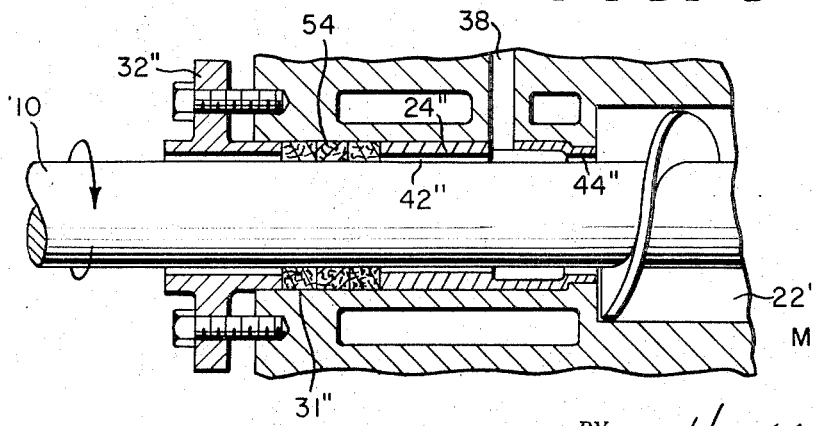
FIG. 5 shows yet another embodiment in which packing is used with the restricting sleeve.

In the embodiment of FIG. 5, optional packing rings 54 are added in bore 31''. Sleeve 24'' and packing rings 54 are retained by gland 32''. These rings can be tightened to shut off leakage of process material through annular space 42'' when the vessel is shut down under positive pressure or can be used to restrict leakage from outside should the process feed stream to passage 38'' be shut down while the vessel is operating at sub-atmospheric pressure. This packing is also useful for pre-startup static pressure testing often required in such systems.

In test runs, a twin screw embodiment of the apparatus illustrated and described herein was supplied with molten 6-6 nylon. During the tests, relative viscosity of the feed polymer was varied from about 20 to about 45. The screws were operated at speeds ranging from 10 to 20 rev./min. The feed rate varied from 30 to 55 lbs./hours, with equal amounts of polymer going to each restricting sleeve. Vessel pressure was varied from 40 to 450 mm. Hg absolute. Radial clearance between the sleeve and shaft in each chamber 44'' was slightly greater than 0.03 inch on a shaft of 3 inches diameter. Each chamber 44'' was about an inch long. Each chamber 42'' was about 3.5 inches in length, with slightly greater than 0.003 inch clearance between the sleeve and shaft. Leakage rate to the atmosphere was about 0.2 gr./min. through each sleeve, with the balance of the polymer going to chamber 22''. The parts shown in FIG. 5 were maintained around 280° to 285°C. by circulating Dowtherm vapor through a jacket surrounding the stuffing box. After one test run of approximately 115 days, UV scans of nylon polymer of increased relative viscosity exiting the extruder showed no evidence of oxidative degradation.

In similar tests, another extruder of corresponding construction and dimensions was supplied with 35-40 lbs./hr. of a two phase stream of 90 percent by weight molten 6-6 nylon polymer of 10 to 15 relative viscosity and 10 percent steam. Leakage rate through each sleeve 24'' was about 1.5 gr./min. After one run of 28 days, UV scans of nylon polymer of increased relative viscosity exiting the extruder showed no evidence of oxidation degradation.

The illustrated throttling-sealing sleeve can also be made adjustable to vary leakage and process flow while in operation, e.g., by providing means to adjust the positions of the sleeves with respect to shoulders on the drive shafts. Instead of a bore in the casing to receive each sleeve and shaft, flanged fittings with suitable bores could be provided. In either instance, the bore itself could be stepped by milling, eliminating the need for separate sleeves. The possibility also exists for machining the shafts 10, 12 where they extend through the vessel while maintaining the bores at a constant diameter to obtain the desired proportions in resistance to flow along the shafts. Other variations and modifications of a similar nature will occur to those skilled in the art without departing from the spirit of my invention which is therefore intended to be limited only by the scope of the appended claims.

What is claimed is:

1. Processing equipment for viscous material comprised of a rotatably driven shaft and a vessel having a casing provided with both a passage for the introduction of a viscous material under higher pressure than in the vessel and a stepped bore through which the shaft extends into the vessel, said bore having end and mid steps with different inside diameters all larger than the shaft, there being clearance between the shaft and said steps, the inner end step having an inside diameter less than the mid step and greater than the outer end step, said passage extending into said bore through the mid step for introduction of said viscous material into said vessel past said inner step and for allowing a small portion of said viscous material to flow past said outer end step.

2. The processing equipment of claim 1, wherein said stepped bore is the inner surface of a sleeve and said casing has an opening adapted to receive the sleeve.

3. In processing equipment for viscous material including at least one rotatably driven shaft and a vessel with at least one passage for the introduction of viscous materials as well as an opening through which the shaft extends from atmosphere into the vessel, a throttling sleeve on the shaft and keyed to the vessel in said opening, said sleeve having end and mid steps with different inside diameters all larger than the shaft to provide clearance between the shaft and the steps, the inner end step having an inside diameter less than the mid step and greater than the outer end step, said passage extending through said sleeve at the mid step for introduction of said viscous material into said vessel past said inner step and for allowing a small portion of said viscous material to flow past said outer end step to atmosphere.

4. In a process for the manufacture of viscous materials including the step of feeding a stream of viscous material under a first pressure through a passage into a vessel for processing under a second pressure, said second pressure being lower than said first pressure and lower than atmospheric pressure, said vessel having a bore through which a rotating shaft extends from atmosphere into the vessel, there being clearance between said shaft and said bore, the method of sealing said shaft comprising: feeding a portion of said stream into said vessel between said shaft and said bore in one direction while allowing another portion to flow in the opposite direction to atmosphere, by establishing a lower resistance to flow of said material in said one direction than in said opposite direction.

* * * * *